Jan. 4, 1955     B. W. SITTERLY     2,698,935
LORAN TRACKING SYSTEM

Filed March 19, 1946     3 Sheets-Sheet 1

INVENTOR
BANCROFT W. SITTERLY

BY *M. Hayes*

ATTORNEY

Jan. 4, 1955  B. W. SITTERLY  2,698,935
LORAN TRACKING SYSTEM

Filed March 19, 1946  3 Sheets-Sheet 2

INVENTOR
BANCROFT W. SITTERLY

BY  *M. O. Hayes*

ATTORNEY

Jan. 4, 1955  B. W. SITTERLY  2,698,935

LORAN TRACKING SYSTEM

Filed March 19, 1946  3 Sheets-Sheet 3

INVENTOR
BANCROFT W. SITTERLY

BY

ATTORNEY

United States Patent Office 2,698,935
Patented Jan. 4, 1955

2,698,935

LORAN TRACKING SYSTEM

Bancroft W. Sitterly, Washington, D. C., assignor, by mesne assignments, to the United States of America as represented by the Secretary of the Navy Application March 19, 1946, Serial No. 655,436

14 Claims. (Cl. 343—103)

This invention relates to apparatus for navigating a ship or other moving object along a predetermined track, and more particularly to apparatus for navigating along such a track in response to the adjustment of two long range navigation receivers.

In patent application, Serial No. 599,163, filed June 13, 1945, now Patent No. 2,689,346, of J. A. Pierce, D. E. Kerr, and J. C. Street, is disclosed a long range navigation system which enables a navigator to locate himself on the surface of the earth. This system comprises broadly two pairs of spaced pulse transmitters and a receiver for the transmitted pulses with the necessary timing and indicating equipment at the point to be located. The difference in arrival time of corresponding pulses from each pair of transmitters is measured. With this information and information as to the time relation of the corresponding pulses from each pair of transmitters a location may be established along two spherical hyperbolas having their foci at respective pairs of transmitters. The intersection of these hyperbolas will fix the position of the receiver.

In practice, charts of the area of interest are prepared having the family of hyperbolas plotted thereon corresponding to each pair of transmitters. Using these charts the navigator at the receiver has only to measure the arrival time difference of the corresponding pulses from each pair of transmitters, and then determine the receiver position by interpolating the distance between the two adjacent hyperbolas of each family nearest to the measured arrival time difference for that family.

At times whose intervals are determined by the speed of the ship, measurements may be taken and locations corresponding thereto determined on the charts to permit a track of the ship to be plotted thereon. While this procedure is routine, there is an obvious disadvantage, one that is also inherent with other navigation systems, in that the track plotted shows the ship's past position but gives no indication of the future position.

It is accordingly an object of this invention to provide apparatus for navigating a ship or other moving object along any predetermined track.

It is a further object of this invention to provide apparatus for navigating a ship or other moving object along any predetermined track in response to the adjustment of two long range navigation receivers.

It is a further object of this invention to provide apparatus for automatically navigating a ship or other moving object along a predetermined track in response to the adjustment of two long range navigation receivers. It is still another object of this invention to provide apparatus for following the changes in the adjustments of two long range navigation receivers so that the ratio between the two readings will be an indication of the track being followed.

Other and further objects of this invention will be apparent from the following description, accompanied by drawings, in which.

In navigation by compass from one given point to another, it is convenient to follow a track along which the compass reading remains constant (a rhumb line). In long range radio navigation it would be convenient to follow a track along which some quantity displayed by the indicator remained constant. In the special case of constant T this is done now. The term "T" as defined in long range radio navigation refers to the apparent time difference between the emission of pulses from the two coupled stations.

The geographical rhumb line between two points is the line along which the rates of change (in distance/time) of latitude and of departure bear a constant ratio. A corresponding long range radio navigation rhumb line may be defined as a line along which the rates of change (in micro-seconds/time) of two long range radio navigation co-ordinates bear a constant ratio. (The line of constant T is a special case, the ratio being zero or infinity.) It is concave, in general, towards the base line of the transmitters with a radius of curvature depending on its bearing relative to the center line, its distance from the base lines, and the angle between the base lines.

A rather direct track may be obtained by cutting across two families of hyperbolic lines in such a way that the rates of change of the two receiver readings constantly bear the same ratio to each other as the total changes between initial and final readings. Along such a track, if the changes in one receiver reading are automatically or manually followed while the changes in the second receiver reading are constrained to vary in the pre-designated ratio to the variation in the first reading, then the second receiver reading will indicate to the pilot whether or not the predetermined track is being followed. The steering mechanism could be controlled by the second reading so as to maintain the correct reading by directing the vessel along the chosen track. Or, both readings could be kept matched independently and the ratio setting would be an indication of the track at that time.

Figure 1:
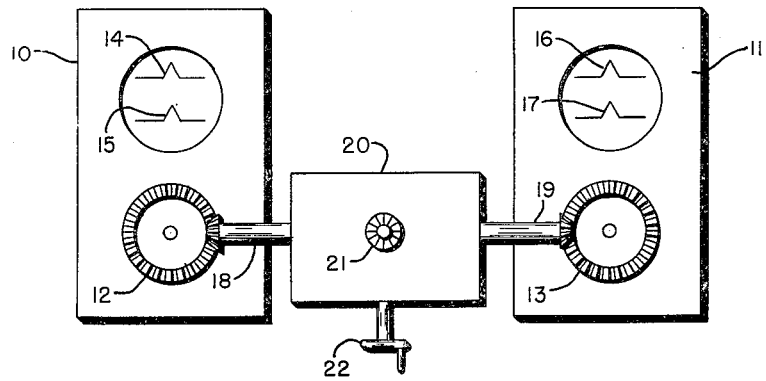
Fig. 1 is a block diagram of one embodiment of this invention.
Figure 9:
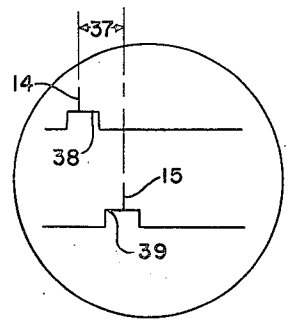
Figs. 9 and 10 are details of certain indicator presentations.
Figure 10:
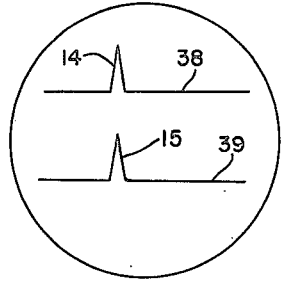

In Fig. 1, each of the two long range radio navigation receivers, 10 and 11, which are of the type disclosed in the above identified application and described in detail therein and only broadly here, has a calibrated delay control attachment, 12 and 13, respectively, by means of which the two pulses in each receiver, 14 and 15 in receiver 10 and 16 and 17 in receiver 11, may be kept in coincidence by introducing a calibrated compensating delay. This is shown in greater detail in Figs. 9 and 10. The normal receiver presentation is shown in Fig. 9 where pulse 14 is the indication from one transmitter of a pair and pulse 15 is the indication from the other transmitter. The delay time between pulses can be read directly from the presentation and in this illustration will be the horizontal displacement, 37, of the pulses. Greater accuracy is attained by expanding a portion of each trace 38 and 39, varying a calibrated compensating delay by means of multivibrators in the receiver to bring the pulses into coincidence as in Fig. 10, and reading the delay time between pulses from the calibrated dials of the delay control.

Referring again to Fig. 1, the two delay control shafts, 18 and 19, are fed from a "gear box" 20, or electrical equivalent, the ratio of which is adjustable to the desired ratio of the rates of change of the two receiver readings.

Figure 2:
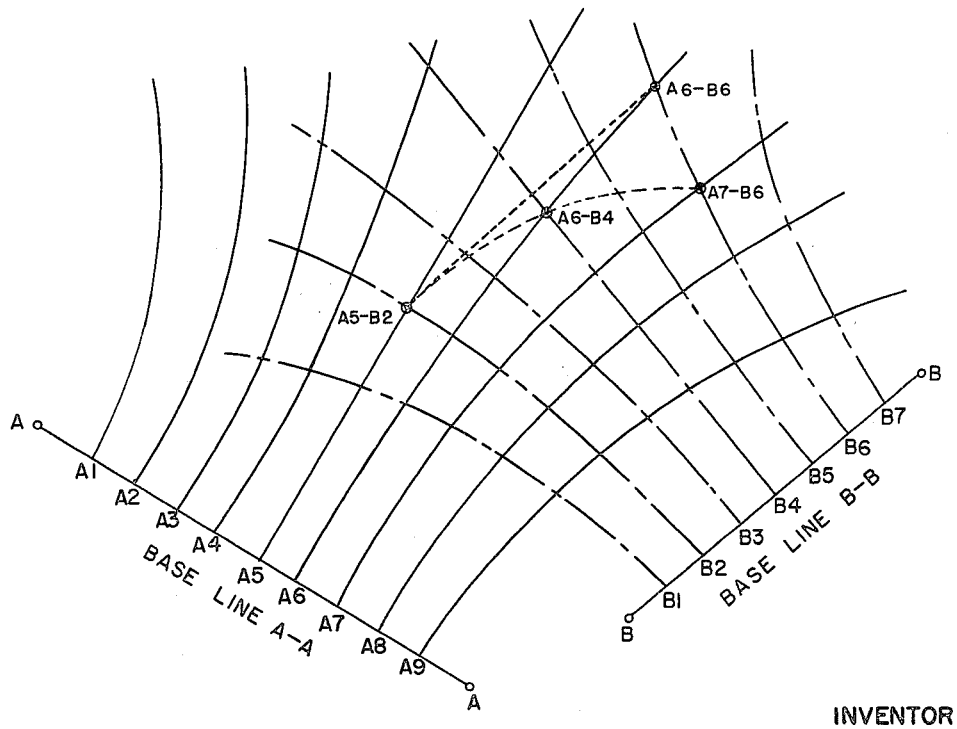
Fig. 2 is a chart of two families of hyperbolas with various tracks plotted thereon.

As an illustration of the operation refer to Fig. 2 which is a plot of two families of hyperbolas corresponding to two pair of transmitters A—A and B—B. Assume that the hyperbolas A1, A2, A3, . . . and B1, B2, B3, . . . are chosen so that the spacing between adjacent hyperbolae of a family will correspond to an incremental time delay of 100 microseconds. Now assume that it is desired to proceed from a present location A5—B2 to some new location A7—B6. Also assume that receiver 10 is receiving pulses from transmitters A—A and receiver 11 is receiving pulses from transmitters B—B. At the present location A5—B2, the delay controls 12 and 13 would be set so that both pairs of pulses are in coincidence as in Fig. 1. As in one family of hyperbolae, the change is from A5 to A7 and in the other family from B2 to B6, the ratio of the change is $$\frac{A5-A7}{B2-B6} \left( \text{or } \frac{A7-A5}{B6-B2} \right)$$

and in this illustration the ratio would thus be $$\frac{200 \text{ microseconds}}{400 \text{ microseconds}} = \frac{1}{2}$$

Thus, the ratio setting dial 21 Fig. 1, would be set for a ratio of ½ in rotation between delay control shafts 18 and 19.

Figure 3:
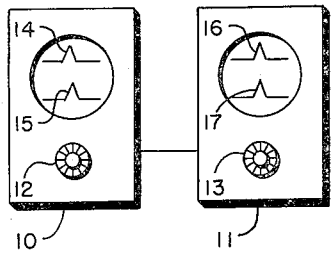
Figs. 3 and 4 are certain indicator presentations.
Figure 4:
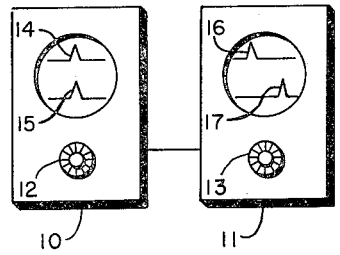

While proceeding from the starting location A5—B2, the delay control 22, Fig. 1, is turned to keep the pulses 14 and 15 coincident on receiver 10. If tracks A5—B2 to A7—B6 is followed, then the pulses 16 and 17 on receiver 11 will hold coincidence as shown for an intermediate point A6—B4 in Fig. 3. If, however, there is deviation from the predetermined track to follow some other track such as A5—B2 to A6—B6, then the pulses 16 and 17 of receiver 11 will depart from coincidence as shown in Fig. 4. In this illustration presumably the pilot or navigator will observe the lack of coincidence of the pulses in receiver 11 and will correct the heading of the vessel so that it returns to the desired track.

Figure 6:
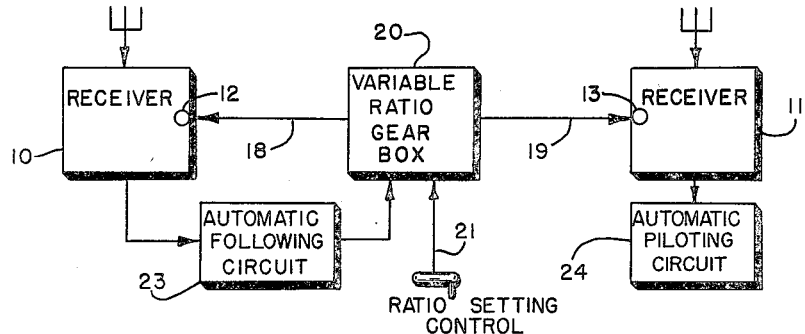
Fig. 6 is a block diagram of another embodiment of the invention.

Another embodiment of this invention would be to make the circuit automatic. Referring to Fig. 6, the delay controls 12 and 13 on receivers 10 and 11 respectively are set to bring the pulses on each receiver into coincidence and the ratio setting control 21 is set for the proper ratio between delay control shafts 18 and 19. The automatic following circuit 23 is connected to receiver 10 and delay control box 20 in such a way that the pulses of receiver 10 always remain in coincidence. An automatic piloting circuit 24 is connected to receiver 11 and to the vessel's controls in such a way that the vessel is piloted to keep the pulses of receiver 11 in coincidence. Thus, the vessel will automatically follow a predetermined track, and do so without corrections for air currents, sea currents, tide, or any other variation of navigation.

Another feature of this invention is that the delay controls 12 and 13, Fig. 1, when properly graduated, continuously furnish the long range radio navigation co-ordinates at the instant, so long as both pairs of pulses are coincident.

It is understood that various constant ratio lines might be connected together by the navigator to form an approximate great circle or any other desired track.

Figure 5:
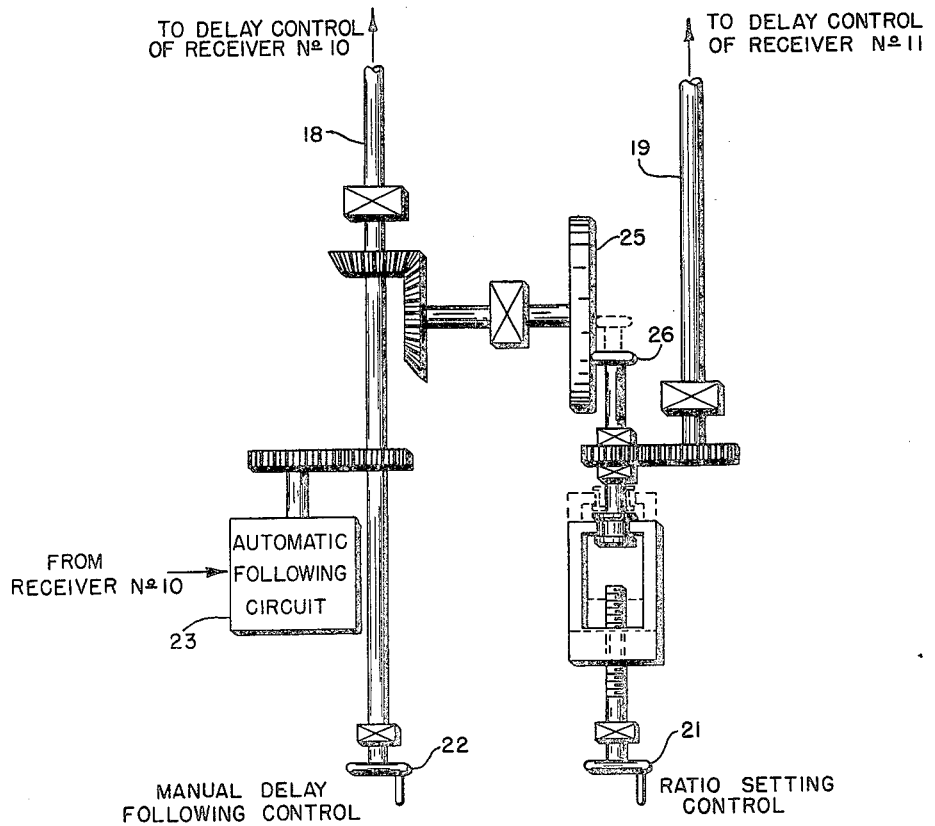
Fig. 5 is a mechanical schematic view of one part of the invention.

In Fig. 5, is shown one arrangement of components which might be used for the variable ratio delay control 20 of Fig. 1. In this arrangement the delay control shaft 18 for receiver 10 is driven either manually from control 22 or automatically from the automatic following circuit 23 from receiver 10. Coupled to the delay control shaft 18 is a smooth disk 25 which drives a roller 26. This roller is movable along a radius of disk 25 by means of the ratio setting control 21. This comprises a well known variable speed mechanism in that when roller 26 is at the center of disk 25 no motion is transmitted from the latter to the former and when the roller is at the outer edge of the disk the maximum motion is transmitted from the disk to the roller. Roller 26 drives the delay control shaft 19 to receiver 11. The ratio setting control 21 determines the ratio of rotation of disk 25 and roller 26 and, therefore, controls the ratio of rotation between delay control shaft 18 and delay control shaft 19.

Figure 7:
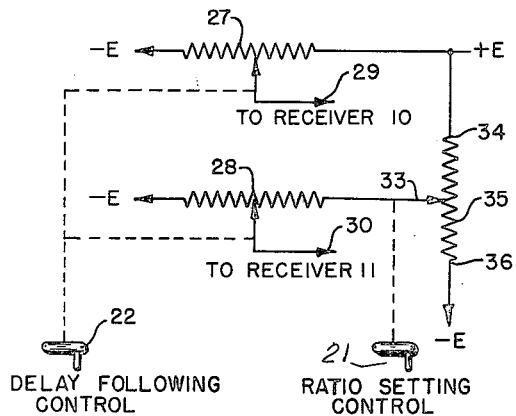
Fig. 7 is an electrical schematic view of one part of the invention.
Figure 8:
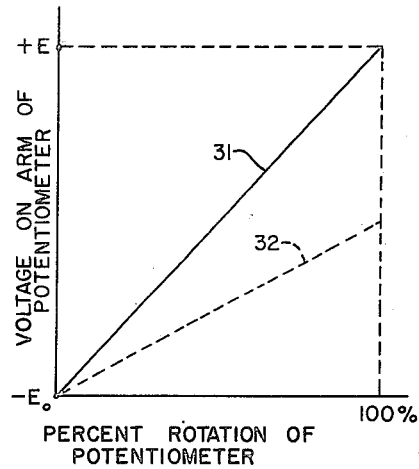
Fig. 8 is a plot of voltage of certain parts of Fig. 7.

It is to be understood that this is only one of many variable ratio drives that could be used for this purpose. This drive need not be limited to mechanical apparatus but could just as well be an electrical delay control, such as the one shown in Fig. 7. Here we assume the delay voltage should vary linearly with shaft rotation. This is accomplished by using linear taper potentiometers 27 and 28 driven from the delay following control 22 and delivering a voltage to receivers 10 and 11. As the delay control 22 is turned, the output voltage at point 29 from potentiometer 27 will vary as curve 31 in Fig. 8. At the same time, the output at point 30 from potentiometer 28 will vary linearly, but the magnitude of voltage will depend upon the setting of potentiometer 35. If arm 33 is set at point 34, then the outputs 29 and 30 will be identical, if the arm 33 is set at point 36, the output at 30 will be zero for all settings of the control 22. At any intermediate point, the output 30 will bear a ratio to the output 29 as determined by the setting of arm 33. This is illustrated in curve 32 of Fig. 8. Thus is accomplished electrically the same results as the mechanical method of Fig. 5. It is also to be understood that this is only one of many electrical arrangements which would accomplish the same purpose.

This invention is not to be limited to the means as exemplified in this specification, but is to be limited only to the extent of the following claims.

What is claimed is:

1. In combination with two long range radio navigation receivers each adapted to receive recurrent pulses from a pair of transmitting stations, means on each of said receivers for indicating the delay in arrival time of the pulses from said corresponding pair of transmitting stations in response to adjustment of said receivers, and means for adjusting said receivers whereby the ratio of the rate of change of said delay may be changed.

2. In combination with two long range radio navigation receivers each adapted to receive recurrent pulses from a pair of transmitting stations, means on each of said receivers for indicating the delay in arrival time of the pulses from said corresponding pair of transmitting stations in response to adjustment of said receivers, and means for adjusting the rate of change of the delay setting of said receivers in a predetermined ratio.

3. The combination of claim 2 and means whereby said predetermined ratio may be adjusted.

4. The method of navigating a moving craft along a selected course in acordance with the indications of radio receiving apparatus responsive to recurrent radio pulses from two pairs of long range radio-navigation transmitting stations, comprising the steps of setting to time coincidence the indications of the two corresponding pulses radiated by each pair of transmitters by adjusting calibrated time delays in the receiver indications, and directing the craft to make the rates of change of time delay adjustments to hold time coincidence of sets of pulses from both pairs of transmitters a constant ratio determined by said selected course.

5. The method of navigating a moving craft along a selected course in accordance with the indications of radio receiving apparatus responsive to recurrent pulses of radio frequency energy radiated in fixed and known time relationship from two pairs of transmitters at known spaced geographical locations, comprising the steps of, setting to time coincidence the indications of the two corresponding pulses radiated by each pair of transmitters by adjusting calibrated time delays in the receiver indications, controlling the time delay adjustment to maintain time coincidence of the indications of pulses from the first of said pair of transmitters during motion of said craft, and adjusting the time delay of indications of pulses from said second of said pair of transmitters simultaneously and in predetermined ratio with the adjustment of the time delay of indications of pulses from said first pair of transmitters, whereby departure from time coincidence of indications of pulses from said second pair of transmitters indicates deviation from said selected course established by said predetermined ratio.

6. The method of navigating a moving craft along a selected course in accordance with the indications of radio receiving apparatus responsive to recurrent pulses of radio frequency energy radiated in fixed and known time relationship from two pairs of transmitters at known spaced geographical locations, comprising the steps of, setting to time coincidence the indications of the two corresponding pulses radiated from each pair of transmitters by adjusting calibrated time delays in the receiver indications, controlling the time delay adjustment to maintain time coincidence of indications of pulses from a first of said pairs of transmitters during motion of said craft, adjusting the time delay of indications of pulses from the second of said pair of transmitters simultaneously and in predetermined ratio with the adjustment of the time delay of indications of pulses from said first pair of transmitters, and directing the course of said craft in response to departure of the indications of pulses from said second transmitter from time coincidence to cause said craft to follow said selected course and maintain time coincidence of said indications of pulses from said second pair of transmitters.

7. Apparatus for a long range radio-navigating system in which recurring pulses of electromagnetic energy in fixed and known time relationship are radiated from two pairs of transmitting stations at known spaced geographical locations, comprising, two pulse receivers adapted to receive pulses from one or the other of said pair of transmitting stations, adjustable calibrated delay devices at each receiver for bringing into time coincidence the corresponding pulses of a set of pulses from said transmitters, means for coupling said delay devices together for simultaneous adjustment in predetermined ratio, and means for varying said adjustment ratio.

8. Apparatus for navigating a moving craft along a selected course by means of a long range radio navigation system in which recurring pulses of electromagnetic energy in fixed and known time relationship are radiated from two pairs of transmitters at known spaced geographical stations, comprising, a first receiver responsive to pulses from one of said pair of transmitters, a second receiver responsive to pulses from the other of said pair of transmitters, first and second adjustable calibrated time delay devices connected to said first and second receivers respectively to indicate the delay in arrival time between the two pulses in a set radiated from a pair of transmitters by bringing the two pulses into time coincidence, control means for adjusting simultaneously in a predetermined ratio, said first and second time delay devices, and means for varying said predetermined ratio in accordance with the direction of said selected course with respect to said stations, whereby, once both sets of pulses from said two pairs of transmitters are adjusted to time coincidence, when changes are made by said control means to maintain time coincidence of pulses received by said first receiver, departure from time coincidence by pulses received by said second receiver indicates deviation from said selected course.

9. Apparatus for navigating a moving craft along a selected course by means of a long range radio navigation system in which recurring pulses of electromagnetic energy in fixed and known time relationship are radiated from two pairs of transmitters at known spaced geographical stations, comprising, first and second receivers responsive to pulses from a first of said pairs of transmitters and a second of said pairs respectively, first and second adjustable calibrated time delay devices connected to said first and second receivers respectively to indicate the delay in arrival time between the two pulses of a set radiated from a pair of transmitters by bringing the two pulses into time coincidence, automatic control means for adjusting simultaneously in a predetermined ratio said first and second delay devices to maintain the pulses received by said first receiver in time coincidence, and means for adjusting said predetermined ratio in accordance with the direction of said selected course with respect to said stations, whereby, once both sets of pulses from said two pairs of transmitters are adjusted to time coincidence, departure from time coincidence by pulses received by said second receiver indicates deviation from said selected course.

10. Apparatus as in claim 9 and means responsive to departure from time coincidence by pulses received by said second receiver for controlling the path of said moving craft to cause said craft to follow automatically said selected course.

11. Apparatus for navigating a moving craft along a selected course in accordance with the indications of radio receiving apparatus responsive to recurrent pulses of radio frequency energy radiated in fixed and known time relationship from two pairs of transmitters at known spaced geographical locations, comprising, first calibrated time delay means adjustable to bring into time coincidence the indications of the two corresponding pulses radiated by a first of said pair of transmitters, second calibrated time delay means adjustable to bring into time coincidence the indications of the two corresponding pulses radiated by the second of said pair of transmitters, and control means for simultaneous adjustment of said first and second time delay means in a predetermined ratio established in accordance with the direction of said selected course with respect to said locations.

12. Apparatus for navigating a moving craft along a selected course in accordance with the indications of radio receiving apparatus responsive to recurrent pulses of radio frequency energy radiated in fixed and known time relationship from two pairs of transmitters at known and spaced geographical locations, comprising first and second calibrated time delay means adjustable respectively to bring into time coincidence the indications of the corresponding pulses radiated by a first and a second pair of said transmitters, control means for simultaneous adjustment of said first and second time delay means in a predetermined ratio, and means for selecting said predetermined ratio in accordance with the direction of said selected course with respect to said locations, whereby changes in adjustment of said first delay means to maintain pulse indications from said first pair of transmitters in time coincidence during motion of said craft cause changes in said second delay means adjustment such that departure from time coincidence of pulse indications from said second transmitter indicates deviation from said selected course.

13. Apparatus as in claim 12 and means for automatically adjusting said first and second delay means in said predetermined ratio to maintain time coincidence of pulse indications from said first pair of transmitters during motion of said craft whereby departure from time coincidence of pulse indications from said second pair of transmitters is an error signal showing magnitude and direction of departure of said moving craft from said selected course established by said predetermined ratio.

14. Apparatus as in claim 12 and means during motion of said craft for automatically adjusting said first and second delay means in said predetermined ratio to maintain time coincidence of pulse indications from said first pair of transmitters and control means, responsive to departure from time coincidence of pulse indications from said second pair of transmitters as a signal showing magnitude and direction of departure of said moving craft from said selected course, for directing the path of said craft to cause it to follow said selected course established by said predetermined ratio.

References Cited in the file of this patent

UNITED STATES PATENTS

| Number | Name | Date |
|---|---|---|
| 2,419,525 | Alford | Apr. 29, 1947 |
| 2,472,129 | Streeter | June 7, 1949 |
| 2,530,428 | Gray | Nov. 21, 1950 |